United States Patent [19]

Martin

[11] Patent Number: 5,139,673
[45] Date of Patent: Aug. 18, 1992

[54] STRAINER ASSEMBLY FOR REMOVING SOLID PARTICULATES FROM OIL

[75] Inventor: Richard J. Martin, Winter Springs, Fla.

[73] Assignee: Westinghouse Electric Corp., Pittsburgh, Pa.

[21] Appl. No.: 632,792

[22] Filed: Dec. 24, 1990

[51] Int. Cl.$^5$ ............................................. B01D 35/02
[52] U.S. Cl. ..................... 210/463; 210/472; 210/499; 55/503; 55/505; 55/525; 55/385.1
[58] Field of Search ............... 210/168, 416.5, 436, 210/449, 450, 455, 459, 460, 462, 463, 472, 495, 497.2, 498, 499; 55/385 B, 385 C, 502, 503, 505, 507, 511, 525

[56] References Cited

U.S. PATENT DOCUMENTS

| | | | |
|---|---|---|---|
| 2,107,109 | 2/1938 | Desrosiers | 210/460 |
| 2,931,507 | 4/1960 | Kent | 210/459 |
| 3,166,500 | 1/1965 | Noakes et al. | 210/449 |
| 3,400,575 | 9/1968 | Madden | 73/61 |
| 3,519,134 | 7/1970 | Hassinger | 210/449 |
| 3,771,624 | 11/1973 | Forgeron | 184/6.24 |
| 4,133,768 | 1/1979 | Theriot | 210/459 |
| 4,615,413 | 10/1986 | Stevenson | 184/6.4 |
| 4,678,589 | 7/1987 | Ayres, Jr. | 210/463 |
| 4,729,400 | 3/1988 | Mendoza et al. | 210/463 |

OTHER PUBLICATIONS

"Criteria and Techniques for Determining Acceptable Cleanliness Levels of Turbine Generator Lubrication Systems", J. Pankowiecki and D. E. Laughlin, presented at the Symposium Proceeding: Rotating Machinery Dynamics, Bearings and Seals, St. Louis, Mo. (1986).

Primary Examiner—Robert A. Dawson
Assistant Examiner—Wanda L. Millard
Attorney, Agent, or Firm—A. C. Addessi

[57] ABSTRACT

A strainer assembly for removing solid particulates from a fluid has a housing shaped as an elbow-shaped conduit and a support member for supporting a screen adjacent a forwardly extending flange on an inlet conduit section of the housing, the housing also comprising an enlarged intermediate section, in which the support member is disposed, and an outlet conduit section. The support member is threadedly engaged in a wall of the enlarged intermediate section of the housing and preferably has a base and a plurality of posts extending from the base, with the screen seated on the distal ends of the posts. Fluid entering the housing through the inlet section passes through the screen and then through passageways between the posts of the support member and is then discharged from the housing through the outlet conduit section.

17 Claims, 2 Drawing Sheets

5,139,673

STRAINER ASSEMBLY FOR REMOVING SOLID PARTICULATES FROM OIL

CROSS-REFERENCE TO RELATIVE APPLICATIONS

This application is related to application Ser. No. 586,850, filed Sep. 24, 1990 in the names of Paul G. Minard and Paul Toy, Jr., entitled "APPARATUS FOR REMOVING SOLID PARTICULATES FROM OIL" which is assigned to the assignee of the present invention.

FIELD OF THE INVENTION

The present invention relates to a strainer assembly for removing solid particulates from oil, such as an assembly used as a sampling device during turbine-generator lube oil flushes.

BACKGROUND OF THE INVENTION

As described in the above-referenced patent, U.S. Pat. No. 5,074,381, the contents of which are incorporated by reference herein, oil in components such as turbines is periodically checked to determine any presence of metallic or other solid particulates to determine the cleanliness of the turbine system. During shutdown for repair or maintenance, for example, oil is flushed through a turbine to oil handling equipment, such as piping, and circulated through a strainer assembly for a predetermined period of time. The strainer is then removed and any solid particulates collected by the strainer analyzed.

When performing an oil flush on a turbine-generator, samples are taken at a plurality of locations in the system, with a strainer incorporated into the system at several locations, or sampling points. Such locations include each bearing, the main oil pump circuit, a point in the air side seal oil, a point on the hydrogen side seal oil, the high pressure operating oil, and the control oil. Only turbine-generators with mechanical hydraulic controls require sampling at the latter two sample points. In order to take a sample, oil is diverted through the strainer for about 30 minutes. This, typically, provides for the passage of between about 3000 to 5000 gallons (11,000 to 19,000 liters) of oil to pass through the screen of a sampling device. A particle count is measured on a 150 mesh sampling screen and the measurement compared to an acceptable criterion. This method provides an accurate representation of pipe cleanliness, whereas, a grab sample, out of the oil reservoir, is a more representative test of oil cleanliness.

Current procedures for taking an oil sample use a basket type strainer lined with a 150 mesh stainless steel screen through which the oil is passed. This basket-type strainer was originally designed for use as a filter and not for collection and analyzing of solid particles in the particle size range of 0.005 to 0.010 inch (0.0127 to 0.0254 cm) range. The original design of such a conventional strainer was meant to capture solid particles of a size above 0.125 inch (0.317 cm) in diameter. These strainers are conventionally lined with a 150 mesh screen to collect small diameter particles.

For this reason, the strainer basket is difficult to wash down when taking a particle count. An oil flush of a three cylinder, nine bearing turbine-generator with mechanical hydraulic control system, for example, could require fourteen locations where basket strainers were inserted and approximately forty samples taken and analyzed. This number of samples requires a great deal of time just to clean the baskets to ensure that a "clean" strainer will not foil a particle count.

SUMMARY OF THE INVENTION

A strainer assembly for removing solid particulates from a fluid, such as oil from a turbine-generator, has a housing formed as an elbow-shaped conduit and a support member for supporting a screen in the housing adjacent a forwardly extending flange on an inlet conduit section of the housing. The elbow-shaped housing has the inlet conduit section, an enlarged intermediate section and an outlet conduit section. The inlet conduit section has the forwardly extending flange thereon, while the distant ends of the inlet and outlet conduit sections have threads for connection to lines for passage of fluid through the housing. Portions of the inlet and outlet conduit sections adjacent the enlarged intermediate section form an obtuse angle to each other, and the inlet conduit section has a vent valve connected thereto.

An opening is provided in the wall of the enlarged intermediate section that is coaxially aligned with the forwardly extending flange on the inlet conduit section and a removable support member is disposed in the enlarged intermediate section, the base of which is sealed in the opening, and the base carries a screen support that disposes a screen between the support member and the flange of the inlet conduit section. Passageways are present in the support member such that fluid entering the enlarged intermediate section of the housing must pass through the screen and then through the passageways prior to exiting through the outlet conduit section.

The support member for the screen has a plurality of posts extending from the base thereof towards the flange of the inlet conduit section and a ring member, having a central opening, is provided on the distal ends of the posts, with the screen extending completely across the central opening of the ring member. The ring member is provided with a recess in which the screen seats and has an inwardly directed ledge about the periphery to secure the screen on the ring member.

A seal is provided between the base of the support member and the wall of the enlarged intermediate section and a seal is also provided between the flange of the inlet conduit section and the ring member for the screen.

DESCRIPTION OF THE DRAWINGS

The invention will become more readily apparent from the following description of a preferred embodiment thereof shown, by way of example only, in the accompanying drawings, wherein.

DETAILED DESCRIPTION

Figure 1:
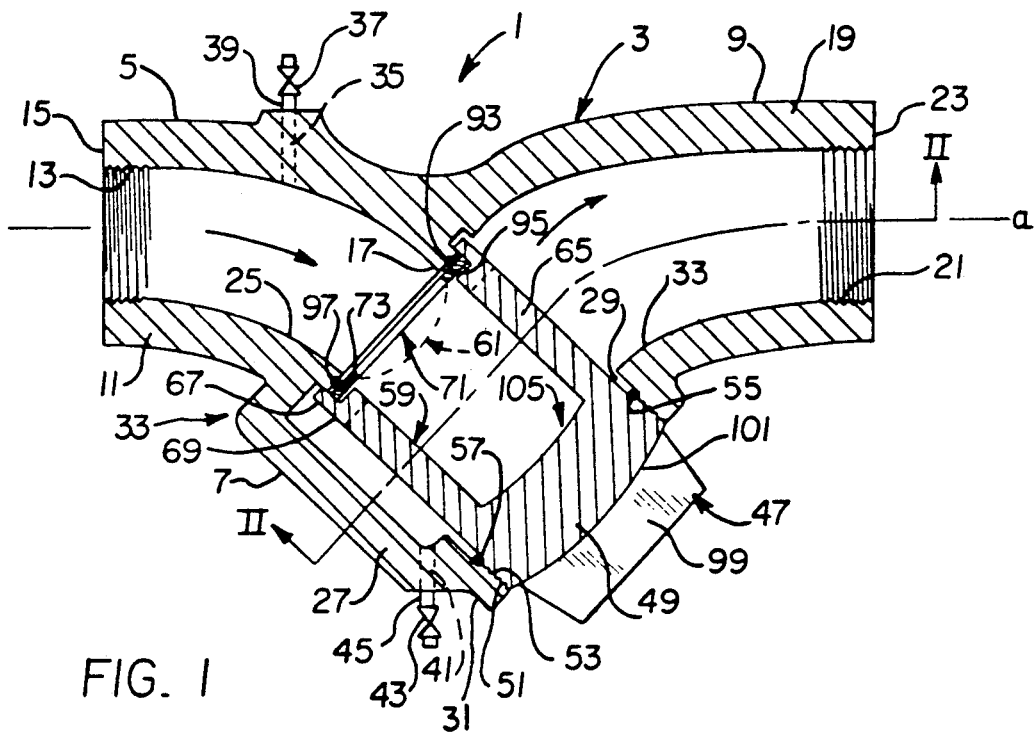
FIG. 1 is a vertical cross-sectional view of the strainer assembly of the present invention.
Figure 2:
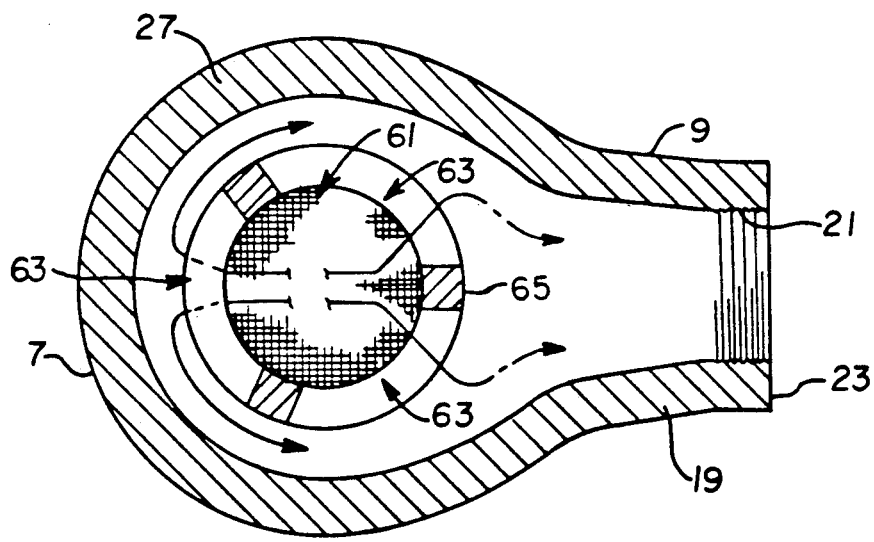
FIG. 2 is a view taken along lines II—II of FIG. 1.
Figure 3:
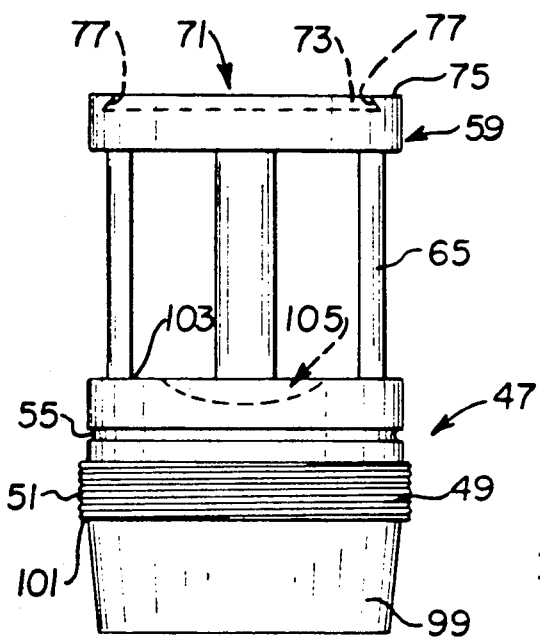
FIG. 3 is an elevational view of a preferred support means for a screen used in the strainer assembly of the present invention.
Figure 4:
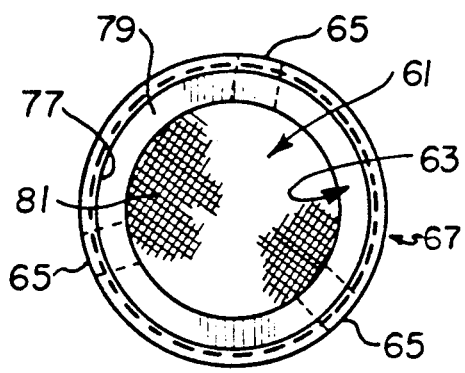
FIG. 4 is a plan view of the preferred support means and screen illustrated in FIG. 3.

Referring now to the drawings, a strainer assembly 1 is shown which has a housing 3, the housing 3 formed as an elbow-shaped conduit with an inlet conduit section 5, enlarged intermediate section 7, and an outlet conduit section 9, and may be a metal casting formed from aluminum As illustrated in FIG. 1, the inlet conduit section 5 has as wall 11 which has connecting means, such as threads 13, on the end 15 of the wall 11 distant from the enlarged intermediate section 7, and the inlet conduit section terminates in a forward extending flange 17 in the enlarged intermediate section 7. The outlet conduit 9 has a wall 19 which has a connecting means, such as threads 21, on the end 23 distant from the enlarged intermediate section 7. A portion 25 of the inlet conduit section 5 and a portion 27 outlet conduit section 9 adjacent the enlarged intermediate section 7 of the housing 3, as shown, form an obtuse angle therebetween. Also, as illustrated, the inlet conduit section, at the distant end 15, may be co-axial with the distant end 23 of the outlet conduit member. The outer shape of the wall 11 adjacent end 15 and the outer shape of the wall 19 adjacent end 23 may be formed in an octagonal shape to accommodate a wrench for ready assembly into a system to be monitored.

The enlarged intermediate section 7 has an opening 29 in the wall 31 thereof, the opening 29 being spaced from and axially aligned with the forwardly extending flange 17 of the inlet conduit section 5. A portion 33 of the wall 27 extends outwardly from the wall 11 of the inlet conduit section 5, spaced from flange 17. The wall of the inlet conduit 5 has a first bore 35 formed therethrough which is spaced from the forwardly extending flange, and a vent valve 37 in line 39 communicates with the bore 35 to provide venting of the inlet conduit 5 to the atmosphere. Likewise, the wall 27 of the enlarged intermediate section 7 has a second bore 41 formed therethrough, preferably adjacent opening 29, and a drain valve 43 in line 45 communicates with the bore 41 to provide for draining of the enlarged intermediate section 7.

A support member 47 is disposed in the enlarged intermediate section 7, which support member 47 has a base 49 secured in and sealing the opening 29 in the enlarged intermediate section 7. Preferably, sealing of the base 49 to the wall 27 of the enlarged intermediate section 7 is effected by threadedly engaging threads 51 on the base 49 with threads 53 on the wall 27 about the opening 29. A more complete seal is obtained by providing a groove 55 about the cylindrical base 49 in which a sealing member 57, such as an 0-ring, is secured which contacts the wall 27 about opening 29. The support member 47 has means 59 for supporting a screen 61, in the enlarged intermediate section 7 of the housing 3, adjacent the forwardly extending flange 17 of the inlet conduit section 5. The support means 59 has passageways 63 therethrough for the passage of fluid which flows through screen 61 to the outlet conduit section 9 of the housing 3.

In the present preferred embodiment of the strainer assembly 1, the means 59, for supporting the screen 61 in the enlarged intermediate section 7 of the housing 3, adjacent the forwardly extending flange 17 of the inlet conduit section 5, comprises a plurality of posts 65 which extend towards the flange 17 from the base 49, with the passageways 63 being the open areas between adjacent posts 65. Three such posts 65 are shown in the drawings, although the particular number of such posts may vary. The posts 65 preferably carry a ring member 67 at the distal ends 69 thereof to aid in supporting the screen 61, the ring member 67 having a central opening 71, with the screen 61 extending completely across the central opening 71. Most preferably, the ring member 67 has a recess 73 in the upper surface 75 and an inwardly directed ledge 77 about the periphery of the surface 75 facing the forwardly extending flange 17 when the strainer assembly is assembled. The screen 61 may thus be snap-fitted under the ledge 77 to secure the screen.

Figure 5:
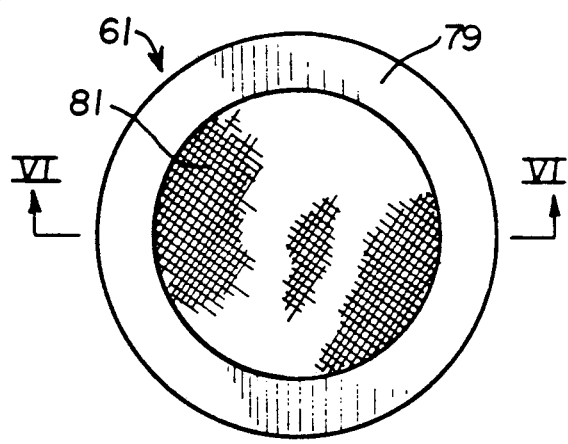
FIG. 5 is a plan view of a screen used in the strainer assembly of the present invention.
Figure 6:
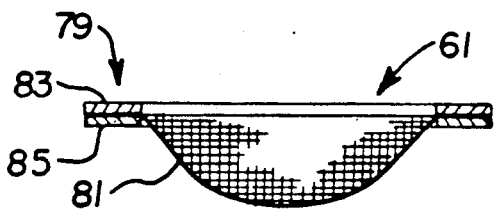
FIG. 6 is a view taken along lines VI—VI of FIG. 5.
Figure 7:
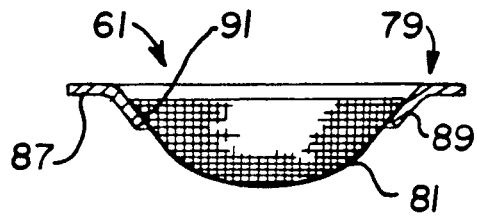
FIG. 7 is a vertical cross-sectional view of an alternate embodiment of a screen for use in the strainer assembly of the present invention.

The screen 61, as illustrated in FIGS. 5-7, has a circular support band 79 with a screen-like mesh 81 attached to the support band 79 extending across and filing an open area of the support band. As shown in FIG. 6, the screen 61 may comprise a circular support band 79 having two disc-shaped bands 83 and 85, with the screen-like mesh 81 sandwiched therebetween and secured thereby. Or, as shown in FIG. 7, the screen 61 may comprise a circular support band 79 having a single disc-shaped band 87, with an inwardly and downwardly extending inner shoulder 89, with the screen-like mesh 81 secured at the edge 91 thereof to the shoulder 89. The ledge created by the bands 83, 85 or 87 will help to keep particles from falling off the screen-like mesh 81 during disassembly. The screen-like mesh 81 of screen 61 may be formed from any suitable material, such as stainless steel or a polyester material, the latter preferred due to cost and formability. A polyester screen-like mesh 81 would be disposable, and, in the event of rupture, only a few soft fibers of polyester would be introduced into the oil system of a turbine-generator. During operation of the strainer assembly 1 to determine the presence of solid particulates in a fluid, such as the oil of a turbine generator system, the strainer assembly is inserted into the desired section of the system. The assembled strainer assembly is engaged with the desired section of the system by engaging the threads 13 of the inlet conduit section 5 and the threads 21 of the outlet conduit section 9 engaged with threads on portions of the desired section of the turbine generator system. The flow of oil is then effected, with the oil flowing through inlet conduit section 5 and through the screen 61 which will collect any solid particulates carried by the oil. The oil, after passage through screen 61, then passes around the posts 65 and through passageways 63 to the outlet conduit section and is returned to the turbine generator system. After a predetermined period of time, the flow of oil is stopped. With vent valve 37 and drain valve 43, which are closed during passage of oil through the strainer assembly 1, opened, residual oil contained in the strainer assembly is removed. The support member 47 is then removed from the remainder of the strainer assembly 1, by unthreading the threads 51 on base 49 from threads 53 on wall 27 using the hand grip 99. The screen 61 is then readily removed from the support member 47 and a new screen 61 engaged therewith for subsequent use. The removed strainer 61, being disc-shaped is easy to clean and simple to manufacture as a disposable part. The present strainer assembly can be disassembled for sampling without the need of tools and the bottom accessibility feature lessens the chance of contamination of the screen from any air born dust particles. Using the elbow-shaped conduit, the present strainer assembly is less restrictive to flow than most basket-type strainers.

If desired, in order to perfect a seal between the forwardly extending flange 17 of the inlet conduit section 5 and the screen 61, a groove 93 may be formed in the end face 95 of the flange 17 and a sealing member 97, such as an 0-ring, secured in the groove and placed in contact with the circular support band 79 of a screen 61 when the strainer assembly is assembled. When the support member 47 is formed from a metal casting, sealing member 97 is desired. However, the circular support band 79 may be formed from a hard but flexible material, such as a hard rubber, and adequate sealing may be then achieved without the use of sealing member 97.

Manual placement and removal of the support means 59 is readily achieved by use of a handgrip 99, that is provided on the exposed surface 101 of the base 49 of the support member 47. The inner surface 103 of the base 49 may have a concave recess 105 formed therein to provide a beneficial flow pattern to fluid striking the same, so as to divert the fluid outwardly through the passageways 63 between the posts 65.

I claim:

1. A strainer assembly for removing solid particulates from a fluid comprising:
   a housing formed as an elbow-shaped conduit having an inlet conduit section terminating in a forwardly extending flange, an enlarged intermediate section, and an outlet conduit section, with portions of said inlet and outlet conduit sections adjacent the enlarged intermediate section forming an obtuse angle therebetween;
   an opening in a wall of said enlarged intermediate section spaced from and axially aligned with the forwardly extending flange of said inlet conduit section;
   a support member having a base secured in and sealing said opening, the support member having means for supporting a screen in said enlarged intermediate section adjacent the flange of said inlet conduit section, said means for supporting a screen including a plurality of posts extending from the base of said support member towards the flange of said inlet conduit section, and passageways provided between adjacent posts for flow of fluid therethrough; and
   a screen disposed between said support member and the flange of said inlet conduit section, said that fluid entering the enlarged intermediate section of the housing from said inlet conduit section must pass through said screen, for removal of solid particulates therefrom, prior to passing through said passageways and through said outlet conduit section.

2. A strainer assembly for removing solid particulates from a fluid as defined in claim 1, wherein said inlet conduit section has a wall with a first bore therethrough, spaced from said flange, and a vent valve communicating with said first bore.

3. A strainer assembly for removing solid particulates from a fluid as defined in claim 1, wherein said enlarged intermediate section has a wall with a second bore therethrough and a drain valve communicating with said second bore.

4. A strainer assembly for removing solid particulates from a fluid as defined in claim wherein said inlet conduit section has a wall and threads are provided in said inlet conduit section wall at the end thereof distant from said enlarged intermediate section, and said outlet conduit section has a wall and threads are provided in said outlet conduit section wall at the end thereof distant from said enlarged intermediate section.

5. A strainer assembly for removing solid particulates from a fluid as defined in claim 4, wherein the distant ends of said inlet conduit section and said outlet conduit section are coaxially aligned.

6. A strainer assembly for removing solid particulates from a fluid as defined in claim 1, wherein threads are provided in the wall of said enlarged intermediate section about said opening therein and the base of said support member has threads thereon engageable therewith, and a groove is provided about the outer surface of said base, with a sealing member provided in said groove and contacting the wall of said enlarged intermediate section to provide a seal therebetween.

7. A strainer assembly for removing solid particulates from a fluid as defined in claim 6, wherein the base of said support member has an exposed surface when threadedly engaged in said opening, and a handgrip is provided on said exposed surface for securing and removing the support member from the threaded opening in the enlarged intermediate section.

8. A strainer assembly for removing solid particulates from a fluid as defined in claim 1, wherein a ring member, having a central opening, is provided on the distal ends of said plurality of posts and said screen extends completely across the central opening of said ring member.

9. A strainer assembly for removing solid particulates from a fluid as defined in claim 8, wherein said ring member has a recess therein and an inwardly directed ledge about the periphery of a surface facing said flange and said screen is disposed in said recess and secured thereon by said ledge.

10. A strainer assembly for removing solid particulates from a fluid as defined in claim 9, wherein said screen comprises a circular support band with a screen-like mesh attached to the support band extending across and filing an open area of said support band.

11. A strainer assembly for removing solid particulates from a fluid as defined in claim 10, wherein said support band has two disc-shaped bands with the screen-like mesh sandwiched therebetween and secured thereby.

12. A strainer assembly for removing solid particulates from a fluid as defined in claim 10, wherein said support band comprises a single disc-shaped band with an inwardly and downwardly extending inner shoulder, with the screen-like mesh secured to said shoulder.

13. A strainer assembly for removing solid particulates from a fluid as defined in claim 8, wherein the forwardly extending flange of said inlet conduit section has an end face and a groove is provided in said end face, with a sealing member provided in said groove and in contact with said ring member to provide a seal therebetween.

14. A strainer assembly for removing solid particulates from a fluid comprising:
   a housing formed as an elbow-shaped conduit having an inlet conduit section terminating in a forwardly extending flange, an enlarged intermediate section, and an outlet conduit section, with portions of said inlet and outlet conduit sections, adjacent the enlarged intermediate section, forming an obtuse angle therebetween;

an opening in said enlarged intermediate section spaced from and axially aligned with the forwardly extending flange of said inlet conduit section;

a removable screen support having a base secured in and sealing said opening, said screen support having a plurality of posts extending from said base towards the flange of said inlet conduit section and a ring member having a central opening, on the distal ends of said plurality of posts, for sealing contact with the flange of said inlet conduit section; and a screen, disposed between said ring member and the flange of said inlet conduit section, extending completely across the central opening of said ring member such that fluid entering the enlarged intermediate section of the housing from said inlet conduit section must pass through the screen, for removal of solid particulates therefrom, prior to passing around said posts and through said outlet conduit section.

15. A strainer assembly for removing solid particulates from a fluid as defined in claim 14, wherein said inlet conduit section has a wall with a first bore therethrough, spaced from said flange, and a vent valve communicating with said first bore, and said enlarged intermediate section has a wall with a second bore therethrough and a drain valve communicating with said second bore.

16. A strainer assembly for removing solid particulates from a fluid as defined in claim 14, wherein said inlet conduit section has a wall and threads are provided in said inlet conduit section wall at the end thereof distant from said enlarged intermediate section, and said outlet conduit section has a wall and threads are provided in said outlet conduit section wall at the end thereof distant from said enlarged intermediate section.

17. A strainer assembly for removing solid particulates from a fluid as defined in claim 14, wherein a ring member, having a central opening, is provided on the distal ends of said plurality of posts and said screen extends completely across the central opening of said ring member.

* * * * *